United States Patent
Pope et al.

(10) Patent No.: US 8,858,325 B2
(45) Date of Patent: Oct. 14, 2014

(54) TEAM ELECTRONIC GAMEPLAY COMBINING DIFFERENT MEANS OF CONTROL

(75) Inventors: Alan T. Pope, Poquoson, VA (US); Olafur S. Palsson, Chapel Hill, NC (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 4 days.

(21) Appl. No.: 13/166,226

(22) Filed: Jun. 22, 2011

(65) Prior Publication Data

US 2011/0300523 A1     Dec. 8, 2011

Related U.S. Application Data

(63) Continuation-in-part of application No. 11/536,811, filed on Sep. 29, 2006, now Pat. No. 8,062,129.

(60) Provisional application No. 61/361,086, filed on Jul. 2, 2010.

(51) Int. Cl.
    *G06F 17/00*     (2006.01)
    *A63F 13/40*     (2014.01)
    *A63F 13/20*     (2014.01)

(52) U.S. Cl.
    CPC ......... *A63F 13/06* (2013.01); *A63F 2300/1012* (2013.01); *A63F 13/10* (2013.01); *A63F 2300/6045* (2013.01)
    USPC ........................................................ 463/31

(58) Field of Classification Search
    USPC ................. 463/23, 31–39; 434/29, 236–238, 434/307 R, 322, 323, 362
    See application file for complete search history.

(56) References Cited

U.S. PATENT DOCUMENTS

| | | | |
|---|---|---|---|
| 7,331,870 B2* | 2/2008 | Smith et al. | 463/36 |
| 7,737,944 B2* | 6/2010 | Harrison et al. | 345/156 |
| 7,782,297 B2* | 8/2010 | Zalewski et al. | 345/156 |
| 8,113,119 B2* | 2/2012 | Crawford | 102/313 |
| 8,116,841 B2* | 2/2012 | Bly et al. | 600/391 |

\* cited by examiner

*Primary Examiner* — Ronald Laneau
(74) *Attorney, Agent, or Firm* — Jennifer L. Riley; Thomas K. McBride, Jr.

(57) ABSTRACT

Disclosed are methods and apparatuses provided for modifying the effect of an operator controlled input device on an interactive device to encourage the self-regulation of at least one physiological activity by a person different than the operator. The interactive device comprises a display area which depicts images and apparatus for receiving at least one input from the operator controlled input device to thus permit the operator to control and interact with at least some of the depicted images. One effect modification comprises measurement of the physiological activity of a person different from the operator, while modifying the ability of the operator to control and interact with at least some of the depicted images by modifying the input from the operator controlled input device in response to changes in the measured physiological signal.

12 Claims, No Drawings

TEAM ELECTRONIC GAMEPLAY COMBINING DIFFERENT MEANS OF CONTROL

CROSS-REFERENCE TO RELATED APPLICATION

This patent application is a continuation-in-part of U.S. patent application Ser. No. 11/536,811, filed Sep. 29, 2006, now issued as U.S. Pat. No. 8,062,129. This application is related to commonly owned U.S. application Ser. No. 13/166,166, entitled PHYSIOLOGICALLY MODULATING VIDEOGAMES OR SIMULATIONS WHICH USE MOTION-SENSING INPUT DEVICES, and to commonly owned U.S. application Ser. No. 61/499,733, entitled METHOD AND SYSTEM FOR PHYSIOLOGICALLY MODULATING VIDEOGAMES WHICH USE HAND AND BODY MOTION-SENSING DEVICES, both of which are filed concurrently, the entire contents of both of which are incorporated herein by reference in its entirety. This patent application claims the benefit of U.S. Provisional Patent Application No. 61/361,086, filed Jul. 2, 2010.

STATEMENT REGARDING FEDERALLY SPONSORED RESEARCH AND DEVELOPMENT

This invention was made in part with Government support. The Government may have certain rights in this invention.

FIELD OF THE INVENTION

The present invention relates generally to the use of biofeedback to modify a subject's behavior, mental state, and/or physiological functioning. More specifically, the invention relates to apparatus and methods for modulating an operator's control input to an electronic game or simulator in response to measured physiological activity, such as autonomically-mediated and/or EEG physiological activity, wherein the player thereby learns to control the physiological and/or EEG activity.

BACKGROUND

Biofeedback systems can be used for a variety of purposes, such as to address behavioral disorders, such as Attention Deficit Disorder, and for training job-related physiological activity.

In brainwave biofeedback training, for example, the trainee is typically provided information in the form of a conventionally produced electroencephalograph (EEG) display which shows him how much he is producing the brainwave pattern(s) indicative of attention and/or inattention. This display is typically in bland, minimally motivating formats, and trains individuals by focusing their attention directly on the status of targeted physiological signals. For example, this feedback frequently consists of a video representation of the EEG graph. The procedure, though providing useful information, is often very limited in variation and predictable, and accordingly can induce boredom. This can lead to frustration when progress is slow, and makes it hard to encourage simultaneous desirable changes in multiple physiological parameters due to limitations in ability to attend to multiple signals. Positive reinforcement of attention states can accordingly be difficult to obtain, especially in children.

Additionally, with increased sophistication in technology, human performance has increasingly become an important, frequently limiting, factor in the proper performance of many advanced technology job-related tasks. For example, both inattention and stress overload can play a substantial role in impairing pilot performance and producing flight hazards. Current biofeedback methods are hard to apply to job-related physiological training because the necessary focus on physiological feedback signals can distract trainees from challenging professional tasks. The ability to control physiological activity, such as to control stress or to remain aware of fluctuating attentional states, the ability to maintain effective physiological states, and the ability to recover efficiently from attention lapses or other ineffective physiological states are valuable in task settings requiring recognition and response.

U.S. Pat. No. 5,377,100 to Pope et al. entitled "Method of Encouraging Attention by Correlating Video Game Difficulty with Attention Level" demonstrates the concept of improving attention skill by rewarding specific brain signal patterns with success at playing an action video game. The game is virtually impossible to win until the player exhibits the required brain signal patterns that accompany normal vs. attention-deficit behavior. Once the player exhibits the required "normal" brain signal patterns the game becomes manageable. A measurement system senses EEG signals and routes them to the computer where the game difficulty control sinal is derived. This invention has the disadvantage of requiring extensive reprogramming of a video game, or the complete construction of a new video game, in order to implement the method. Because much video game software is proprietary and/or not available in source code, this software would be unusable for implementing the method.

Some commercial products, for example, "The Mind Drive," sense physiological signals and use the signals alone to drive a video game. Because products like "The Mind Drive" do not deliver biofeedback training while the trainee is playing a game or performing a task in a conventional way, this method does not reinforce desirable physiological changes in the realistic context of task performance. Products like Mind Drive, too, have the disadvantage of requiring extensive video game programming in order to implement the method.

U.S. Pat. No. 6,450,820 to Pope et al. (incorporated by reference herein in its entirety) modulates an electronic game controller using the physiological signals being produced by the player who is manually operating the game controller. This method does not translate well to the situation where a player is very physically active while operating the game controller, such as the Nintendo Wii remote controller (Nintendo and Wii are registered trademarks of Nintendo of America, Inc.), because much movement may disrupt or confound the sensing of physiological signals. The prior art method also does not encompass the situation where a combination of physical game controller input and physiological input from two (or more) different players acting cooperatively combines to affect game performance.

BRIEF SUMMARY OF THE INVENTION

In one embodiment of the invention, a method is provided for modifying the effect of an operator controlled input device on an interactive device to encourage the self-regulation of at least one physiological activity by a person different than the operator. The interactive device comprises a display area which depicts images and apparatus for receiving at least one input from the operator controlled input device to thus permit the operator to control and interact with at least some of the depicted images. The method for modifying comprises the steps of measuring at least one physiological activity of a person different than the operator to obtain at least one physiological signal having a value indicative of the level of the at least one physiological activity, and modifying the ability of the operator to control and interact with at least some of the depicted images by modifying the input from the operator controlled input device in response to changes in the at least one physiological signal.

In addition to the method for modifying the effect of an operator controlled input device on an interactive device to encourage the self-regulation of at least one physiological activity by a person different than the operator, as described above, other aspects of the present invention are directed to corresponding apparatus for modifying the effect of an operator controlled input device on an interactive device to encourage the self-regulation of at least one physiological activity by a person different than the operator.

Additional objects, embodiments and details of this invention can be obtained from the following detailed description of the invention.

DETAILED DESCRIPTION OF THE INVENTION

Previous work by the present inventors has been published as U.S. Patent Application No. 2008/0081692 A1, which is herein incorporated by reference thereto in its entirety.

The present invention now will be described more fully hereinafter, in which preferred embodiments of the invention are discussed. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention includes a method of transforming physiological information obtained from biomedical instruments in order to use that information to modify the functioning of computer simulation or game controllers or joysticks. The invention involves modulation that transforms the controller signals received at a computer's game port or a game console prior to their being used by the computer simulation or game software. The result can be that the magnitude of the effect of the game or simulation's input device (e.g., joystick, game pad, steering wheel) is modulated by the strength of the physiological signal(s). By making the joystick's "control authority" proportional to the physiological signal(s), the player is encouraged to change the physiological signals) according to a programmed criterion (e.g., increase, decrease, or maintain) in order to perform better at the game task. When the physiological signal(s) are the target of physiological self-regulation or biofeedback training, the game play reinforces therapeutic changes in related physiological processes. However, the reinforcing feedback is preferably implicit in the task, and not explicit in the form of direct feedback (bar graphs, tracings), as in conventional biofeedback training. In this way, contingencies for subtle conditioning of the desirable physiological response(s) are set up.

Different embodiments of the present invention are possible, and the components of the invention can vary depending upon implementation. Further, the invention is intended to be used with a variety of systems, such as standard video game systems (e.g., Sony Playstation, Nintendo, etc.), with standard personal computer systems, and with computer simulators and professional job training systems. Additionally, one or more of a wide variety of different measured physiological signals can be used in accordance with the present invention, for example, EEGs, skin temperature, skin conductance, heart rate, and/or event-related potentials (ERPs). U.S. Pat. No. 5,377,100, issued on Dec. 27, 1994 to Pope et al, and which is incorporated herein by reference as if set forth in its entirety, and also specifically at column 3, line 8 to column 5, line 60 that details a method for determining an individual's EEG index of attention, which index can be used to assess his or her mental engagement in a task.

In accordance with at least one embodiment of the present invention, the disclosed apparatus and methods can be used specifically for entertainment purposes. For example, a player might simply use the system for the enjoyment and challenge of mastering a game or simulation, as well as the satisfaction of controlling his own physiological states. It is also within the scope of the present invention that a player could entertain himself by personally using data feedback to set challenges, thresholds and goals for the player to achieve.

Further, it is within the scope of the present invention to utilize a variety of input devices or controllers, as well as to utilize not just joystick or gamepad input ports, but to utilize a variety of other computer input ports as well, and thus varying the connection apparatus, as appropriate, to accommodate the type of port and/or system being utilized. The present invention could possibly utilize interface devices such as touch pads, light pens, power gloves, keyboards and weapons (e.g., hand-held guns), for example. Additionally, it should be noted that when the term "counts" has been used herein the term potentially referred to any one of a variety of types or forms of information that a computer, video game system, and/or training simulator might receive at a computer or game port. For example, it is within the scope of the present invention that the information that the computer software reads from a port could be in the form of a digital value which can be expressed as a number, counts, etc.

Additionally it is expressly within the scope of the present invention that substantially all of the described hardware known to the art, for example as described in U.S. Pat. No. 6,450,820, that is incorporated in its entirety by reference herein, could be replaced with software. That is to say, for example, many functions, such as comparators, timers, threshold detectors, relays, voltage controlled amplifier, voltage controlled modulator, offset circuitry, AND gates, VCO, baseline deviation deriving system, etc., can be accomplished with software. For example, these functions could possibly be programmed in what is commonly known as a "virtual instrument" environment, such as National Instruments' LabView. In at least one embodiment, this type of environment would allow hardware used in the present invention to be replaced by functional modules represented as icons on a screen, which can be set-up and "wired" together. The resulting software system can then function just like its hardware counterpart, for example, interacting with external signals through analog and digital input and output boards installed in the computer.

The present invention fully integrates biofeedback training into a true dynamic video game, or realistic simulation, which turns the popular home pastime of playing video games into an opportunity for therapy or self-improvement. It is the prototype of a new generation of computer game environments that train valuable mental skills beyond eye-hand coordination.

Current systems typically deliver biofeedback in bland, minimally motivating task formats with direct feedback. The present invention's video game or task challenge format motivates trainees to participate in and adhere to the training process through the rewards inherent in mastery of popular video games or job simulators, and without the demand, monotony or frustration potential of direct concentration on physiological signals.

In accordance with at least one embodiment of the present invention, the entertainment value and social interaction experience of electronic gameplay is enhanced by distributing the control and modulation of inputs to electronic games among two or more players, so that joint game goals are collaboratively pursued and accomplished by separate players who provide different means of control and modulation. For example, one or more player may provide physical activity control via game controller(s) (these players may be termed the physical operators) and one or more other individuals influencing the game through physiological activity measured via body sensors (these players may be termed physiological operators).

Such an embodiment avoids the problem of movement disruption of physiological sensing by modulating one player's game controller using the physiological signals of another, collaborating player who is physically inactive. The invention further enables collaborative team play by multiple players with different roles on the team—one or more providing physiological mastery to facilitate game performance and one or more others simultaneously providing manual or physical skills needed to operate the game. This creates richer and more complex gaming opportunities than present games provide, enabling engaging and rewarding team social interactions among people who have different skill sets and interests or who take turns playing different roles on a team—on one hand, providing the physiological self-mastery, and on the other, providing physical performance action skills.

Such an embodiment modulates one or more players' game controller (i.e., game input device operated by physical activity) using the physiological signals of another/other, collaborating player(s) who is/are not providing input to the game via a game controller. The invention accomplishes this function by transmitting control signals, either wired or wirelessly, derived from one or more player's/players' physiological signals to modulate the control over the game of one or more other player/players who are using electronic game controllers, in a way that either retards or boosts game performance influence of the game controllers.

Alternatively, this shared influence over a game of a physiological operator and physical (game controller) operators, respectively, can be implemented by blending influences from both into a single control input into the game; in this manner, game action tasks could be operated either via a game controller or particular predefined physiological input, or through pre-defined combinations of both. For instance, a video game task of an avatar game character jumping over a canyon could be initiated by either the game controller operator or by a physiological operator's particular body activity, and the height or length of the jump could then be solely dependent on the physiological activity of the physiological operator whereas the direction of the jump and place of landing on the other side could be controllable only by the game controller input. Thus, the physiological and game controller operators will have to collaborate to succeed at the task of jumping for good success in the game.

Such an embodiment may be implemented in any of the above-described game systems, simply by having one player's physiological signal(s) sensed by the Physiological Signal Conditioning System (e.g., 104 of FIG. 1 of U.S. Pat. No. 6,450,820) and having another player control the game controller(s) (e.g., joystick 105 of FIG. 1 of U.S. Pat. No. 6,450,820).

Such an embodiment enables two new categories of electronic game play: (1) modulating one or more player's game controller input using the physiological signals of another/other collaborating individuals; and (2) modulating game activity through joint authority over game actions by game controller input from one or more individuals and physiological sensor input from other separate individuals not using game controllers. The embodiment enables physiological and manual control of electronic games to be allocated in various combinations to several players.

Such an embodiment permits individuals who are physically challenged to participate in electronic game play by collaborating with a player who is able to manipulate controls that the challenged player cannot, and enables individuals with different skill sets and interests (physiological self-control vs. physical performance skills) to join together in rewarding game play.

Such an embodiment also enables implementation of unprecedented electronic games that incorporate a classic motif in superhero comics and movies in which differently-abled protagonists collaborate and/or interact, such as Professor X and his cohorts in the X-Men series or Elijah Price and David Dunn in the movie "Unbreakable" and provides opportunities for new kinds of games where the application of "mental powers" of particular individuals (i.e., particular deliberately produced EEG characteristics) can enable or enrich the performance of other individuals playing a game.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range. unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for modifying the effect of an operator controlled input device on an interactive device to encourage the self-regulation of at least one physiological activity by a person different than the operator, the interactive device comprising a display device for showing depicted images and a reception device for receiving at least one input from the operator controlled input device to thus permit the operator to control and interact with at least some of the depicted images, said method for modifying comprising the steps of:
   measuring at least one physiological activity of a person different than the operator, to obtain at least one physiological signal having a value indicative of the level of the at least one physiological activity; and
   modifying the ability of the operator to control and interact with at least some of the depicted images by modifying the input from the operator controlled input device in response to changes in the at least one physiological signal.

2. The method of claim 1, further comprising the step of using the at least one physiological signal to control and interact with at least some of the depicted images.

3. The method of claim 1, wherein the operator is a physical operator and wherein the person different from the operator is a physiological operator.

4. The method of claim 3, wherein the physiological operator does not provide direct input to the interactive device via an operator controlled input device.

5. The method of claim 3, wherein the operators interact with electronically enhanced communication selected from the group comprising audio, video, text, and combinations thereof.

6. The method of claim 3, wherein the physiological operator is wirelessly connected to the interactive device.

7. The method of claim 3, further comprising the step of providing an alternating ability for the operator to take turns predominantly as a physical operator or predominantly as a physiological operator.

8. The method of claim 1, wherein the physiological signal is selected from the group consisting of EEGs, skin temperature, skin conductance, heart rate, and combinations thereof.

9. The method of claim 1, wherein the operator is wirelessly connected to the interactive device.

10. An apparatus for modifying the effect of an operator controlled input device on an interactive device, the interactive device comprising a display device for depicting displayed images and a reception device for receiving control input from the operator controlled input device, wherein the control input permits the operator to control and interact with at least some of the displayed images, said modifying apparatus comprising:
   a measurement device for measuring at least one physiological activity of a person different than an operator of the operator controlled input device;
   a conversion device for converting the at least one measured physiological activity into at least one physiological signal having a value indicative of the level of said at least one physiological activity; and
   an integration device for modifying the operator's control input in response to changes in the at least one physiological signal, to thus modify the operator's ability to control and interact with at least one of the depicted images in response to changes in the at least one physiological signal.

11. An apparatus for modifying the effect of an operator controlled input device on an interactive device, the interactive device comprising a display area, means for depicting images upon the display area, and means for receiving input from the operator controlled input device, the input permitting the operator to control and interact with at least some of the depicted images, said modifying apparatus comprising:
   means for measuring at least one physiological activity of a person different than the operator;
   means for converting the at least one measured physiological activity into at least one signal having a value indicative of the level of said at least one physiological activity; and
   means for modifying the input from the operator controlled input device prior to the input being received by the interactive device; and
   said modifying means comprising means for modifying the input from the operator controlled input device in response to changes in the at least one physiological signal, to thus modify the operator's ability to control and interact with at least one of the depicted images in response to changes in the at least one physiological signal.

12. A method for modifying the effect of an operator controlled input device on an interactive device to encourage the self-regulation of at least one physiological activity by a person different than the operator, the interactive device comprising a display device for showing depicted images and a reception device for receiving at least one input from the operator controlled input device to thus permit the operator to control and interact with at least some of the depicted images, said method for modifying comprising the steps of:
   measuring at least one physiological activity of a person different than the operator, to obtain at least one physiological signal having a value indicative of the level of the at least one physiological activity;
   modifying the ability of the operator to control and interact with at least some of the depicted images by modifying the input from the operator controlled input device in response to changes in the at least one physiological signal; and
   using the at least one physiological signal to control and interact with at least some of the depicted images.

* * * * *